Figure 1:
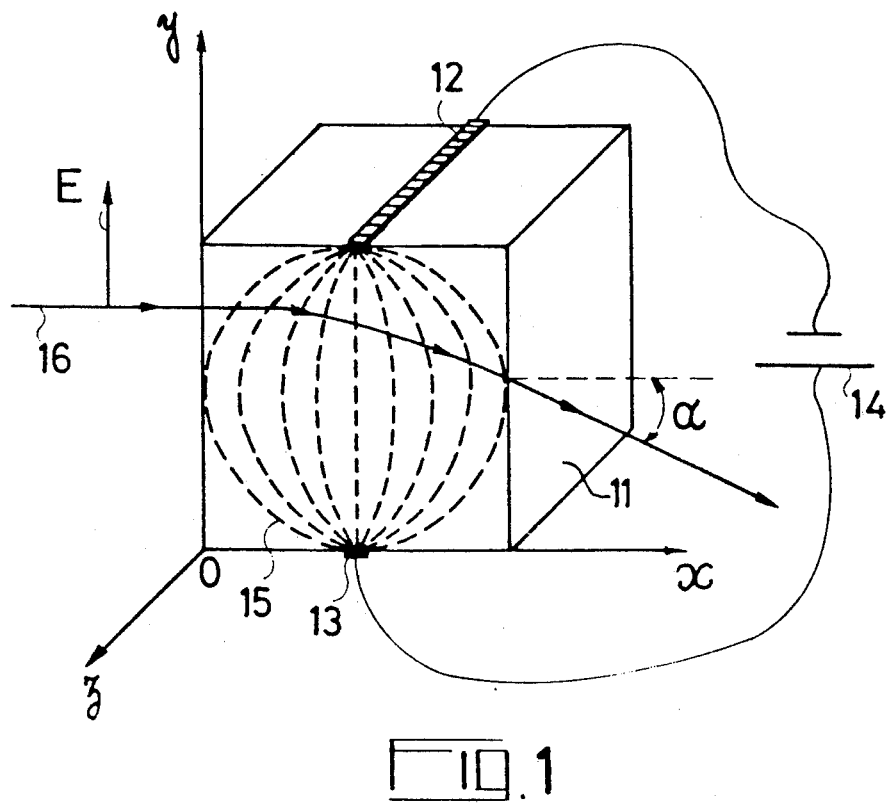

United States Patent [19]

Huignard et al.

[11] 4,124,273

[45] Nov. 7, 1978

[54] VARIABLE VERGENCY FOCUSSING APPARATUS

[75] Inventors: Jean-Pierre Huignard; Claude Puech, both of Paris, France

[73] Assignee: Thomson-Brandt, Paris, France

[21] Appl. No.: 734,974

[22] Filed: Oct. 22, 1976

[30] Foreign Application Priority Data

Oct. 28, 1975 [FR] France .................................. 75 32931

[51] Int. Cl.² ............................. G02F 1/29; G11B 7/08
[52] U.S. Cl. ............................ 350/150; 179/100.3 V; 250/201; 350/175 DR; 358/128
[58] Field of Search ......................... 350/150, 175 DR; 250/201; 179/100.3 V; 358/128

[56] References Cited

U.S. PATENT DOCUMENTS

| 3,424,513 | 1/1969 | Lotspeich | 350/175 DR |
| 3,695,745 | 10/1972 | Furukawa | 350/150 |
| 3,876,875 | 4/1975 | Velzel | 250/201 |
| 3,952,191 | 4/1976 | Tinet | 179/100.3 V |

*Primary Examiner*—John K. Corbin
*Assistant Examiner*—R. A. Rosenberger
*Attorney, Agent, or Firm*—Cushman, Darby & Cushman

[57] ABSTRACT

The invention relates to variable vergency focussing systems which enable the focussing of a light beam on an object to be maintained despite movements of the object. The invention consists in using as variable-vergency element two astigmatic elements made of electro-optical material which are arranged at 90° relative to one another and are subjected to voltages variable in dependence upon the vergency to be obtained.

9 Claims, 5 Drawing Figures

VARIABLE VERGENCY FOCUSSING APPARATUS

This invention relates to variable-vergency focussing apparatus which enable a beam of radiant energy to be focussed on the surface of an object of which the distance from said system may vary by a small amount at a very high speed. A system of this type may be used in the construction of an optical reader intended to read of example the video information recorded in the form of lines of variable length and spacing forming a track on the surface of a support such as a disc.

On account of the high density of information thus recorded, the elements characteristic of the information are extremely small and, in addition, it is necessary for the support to be moved past the reading head, which comprises a focussing system of the type in question, at high speed. The precision of this focussing operation has to be extremely high to obtain a reading spot of sufficiently small dimensions to be able to resolve these characteristic elements. Now, the instability in the movement of the support, in particular along the axis of the convergent reading beam which defines the reading spot, exceeds the limits of this precision to a considerable extent.

Accordingly, it is necessary to use elements for controlling the position of the convergence point which enable fine coincidence to be obtained in spite of this instability. These control elements comprise means for displacing the focussing point of the reading beam along the axis of the focussing system. One known means consists in displacing the front lens of the system, for example by providing it with an electrical winding which is immersed in a magnetic field and which acts in the manner of a loudspeaker coil. On account of the inertia of the mobile elements, the frequency response of this system is limited to a few hundred Hertz. Another means consists in introducing into the optical system a variable-vergency element, such as a mirror with controllable curvature U.S. Pat. No. 3,876,875 or a liquid crystal lens of which the index can be modified under certain conditions U.S. Pat. No. 4,037,929. A controllable-curvature mirror is fragile whilst a liquid crystal lens is delicate to construct.

In accordance with the present invention, it is provided a variable vergency apparatus for focussing an incoming radiant energy beam having a beam axis in a point moveable along said beam axis, said apparatus comprising:

a first electro-optical astigmatic element for first focussing said incoming radiant energy beam alike a first cylindrical lens delivering a first focussed beam; said first astigmatic element having a first astigmatism axis perpendicular to said beam axis;

a second electro-optical astigmatic element for second focussing said foccussed beam in said moveable point alike a second cylindrical lens; said second astigmatic element having a second astigmatism axis perpendicular to said beam axis and perpendicular to said first astigmatism axis, whereby said first and second focussing combines themvelves for focussing said incoming radiant energy beam alike a single spherical lens; and control means for providing to said first and second electro-optical astigmatic elements control voltages for controlling said first and second focussing.

Figure 2:
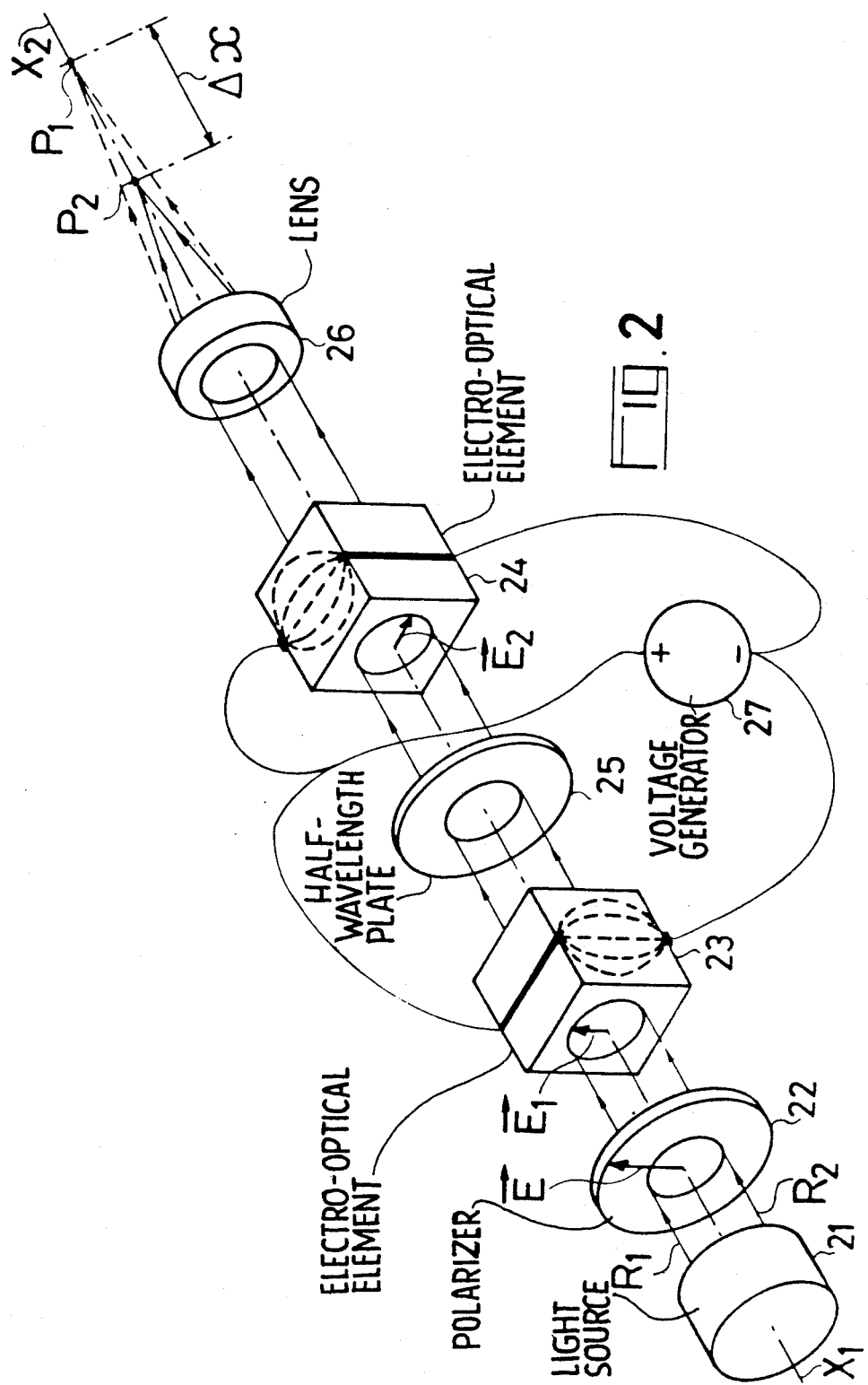
Figure 3:
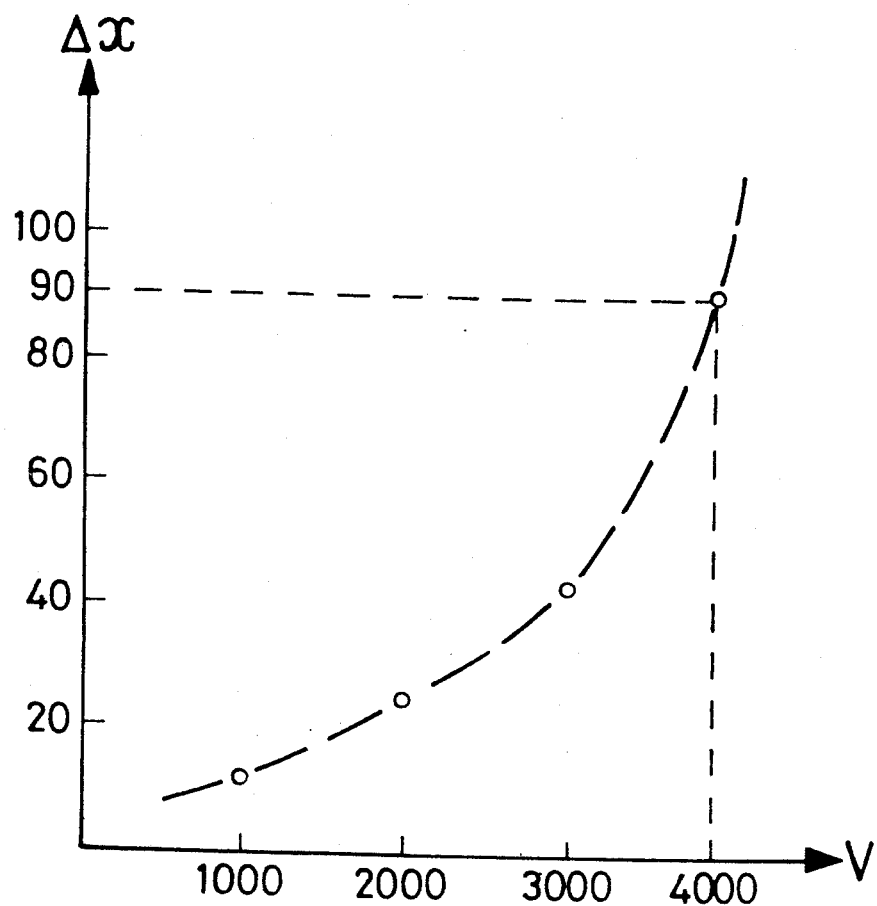
Figure 4:
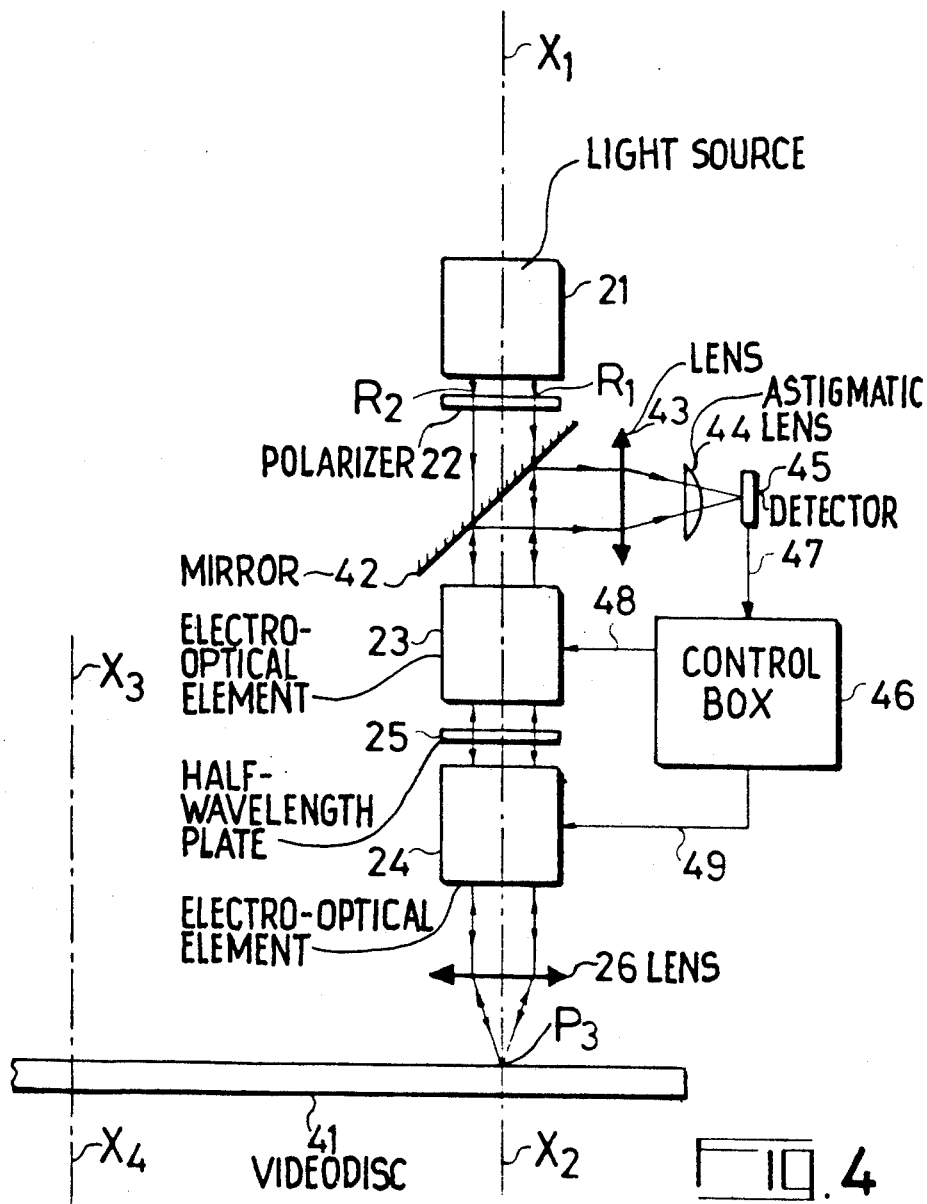
Figure 5:
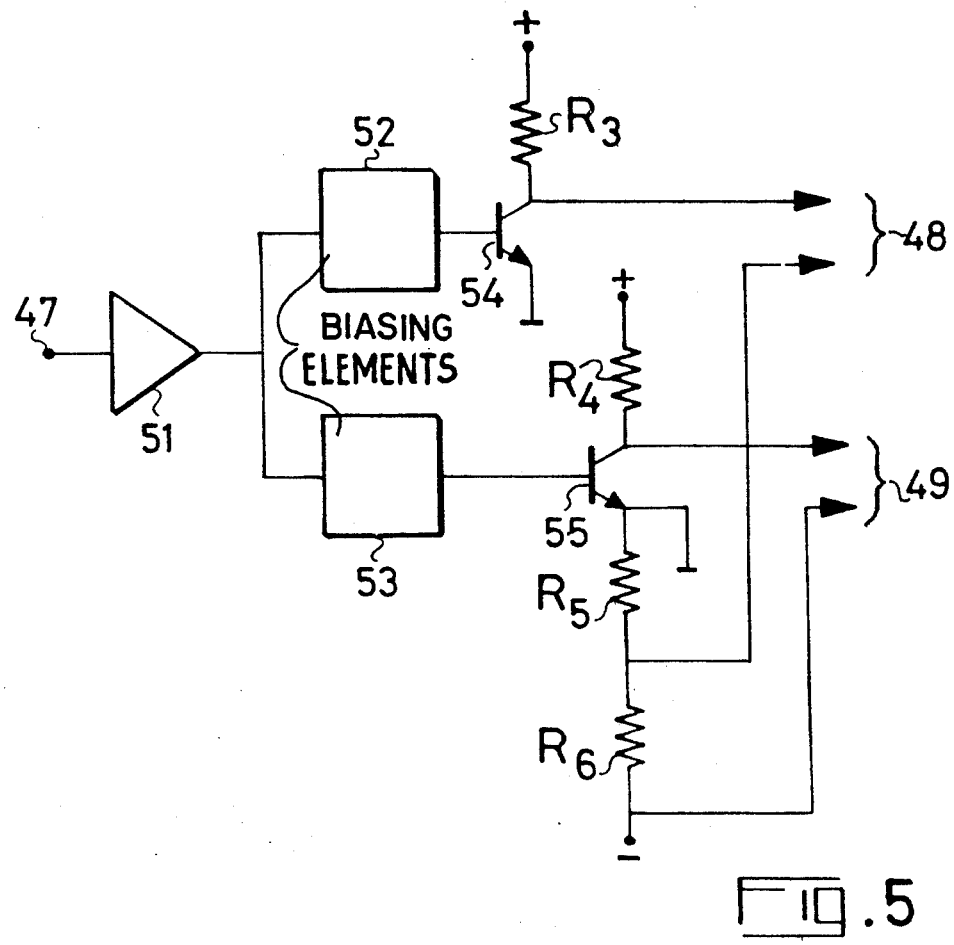

For a better understanding of the invention, and to show how the same may be carried into effect, reference will be made to the ensuing description and to the attached figures among which:

FIG. 1 illustrates an astigmatic element;
FIG. 2 illustrates an experimental arrangement;
FIG. 3 illustrates a characteristic curve;
FIG. 4 diagrammatically illustrates an optical reader;
FIG. 5 illustrates a block diagram of component 46 in FIG. 4.

It is known that certain materials, when subjected to an electrical field, show an electro-optical effect characterised by the appearance of two propagation velocities of light corresponding to two refractive indices, one being the ordinary index $n$ of the material for a light polarized perpendicularly to the electrical field, the other being an extraordinary index $n'$ for a light polarized parallel to that field. This phenomenon is known as the Kerr phenomenom, in which the index $n'$ is a quadratic function of the electrical field.

FIG. 1 shows a cube 11, defined by three orthogonal axes $o\,x\,y\,z$, of such a material. Two substantially linear electrodes 12 and 13 have been arranged along two median lines, parallel to $o\,z$, of the surfaces parallel to the plane $o\,x\,z$. These electrodes are connected to a voltage generator 14. The electrical field thus developed inside the cube shows a cylindrical distribution in a direction parallel to $o\,z$ and the field lines in a plane parallel to the plane $o\,x\,y$ may be represented by the dotted-line curves 15.

The gradient of the electrical field thus represented by the field lines is such that it tends to curve the path of a light beam, such as 16, entering the cube parallel to $o\,x$ and polarized in the direction $\vec{E}$ parallel to $o\,y$. This curvature is such that the beam emerges from the surface opposite the entry surface, forming an angle $\alpha$ with the axis $o\,x$. This phenomenon is similar to the well known phenomenon of atmospheric refraction which is the cause of mirages.

The distribution of the field lines is similar in shape to a cylindrical lens of which the astigmatism axis is parallel to $o\,x$ and centred at the middle of the surfaces parallel to the plane $o\,x\,y$. Calculation of the path of the beams is not easy and it is simpler to verify by experiment whether this element does in fact behave like a lens of this type.

To this end, the experimental arrangement shown in FIG. 2 was set up. This experimental arrangement comprises, aligned on the axis $X_1 X_2$, a light source 21, a polarizer 22, two electro-optical elements 23 and 24, a half wavelength plate 25, a lens 26 and a voltage generator 27.

The light source 21, for example a laser, emits a beam of parallel monochromatic light which, in the Figure, is delimited by the end rays $R_1$ and $R_2$.

This beam passes through the polarizer 22 which polarizes the light along an axis parallel to the vector $\vec{E}$. This polarization is represented by the vector $\vec{E}_1$. It would also be possible to use a laser which directly emits polarized light.

The beam of light thus polarized passes through the element 23 which is a rectangular parallelepiped similar to that shown in FIG. 1 and of which the electrodes are perpendicular to $\vec{E}_1$. The deviation thus obtained in a plane parallel to $\vec{E}_1$ is too small to be visible in the Fig. where the beam still appears to be parallel.

The beam then passes through the half wavelength plate 25 which causes the polarization plane to turn through 90°. The polarization thus obtained is represented by the vector $\vec{E}_2$.

The beam then arrives at the element 24 which is identical with the element 23, but has been turned through 90° relative to it so that its electrodes are perpendicular to $\vec{E}_2$. In this case, the deviation is obtained in a plane parallel to $\vec{E}_2$ and hence perpendicular to the preceding plane of deviation. Once again, it is too small to be visible in the Fig.

The light beam thus subjected to the action of the two elements 23 and 24 is collected by the lens 26 which causes it to converge at a point of the axis $X_1X_2$.

When the voltage applied by the source 27 to the elements 23 and 24 is zero, the deviation which they introduce is zero and this point is situated at $P_1$.

When the voltage supplied by this source is increased, the focussing point is displaced along the axis $X_1 X_2$ towards the lens 26 without the light spot undergoing any significant distortion. This shows that the effect of the elements 23 and 24 is the same as that of the two crossed cylindrical lenses, these lenses being equivalent in the first order to a single spherical lens and, in this case, enabling the vergency of the system to be adjusted.

The numerical values used in this arrangement were as follows:

elements 23 and 24: cubes of PLZT ceramic (titanate-zirconate of lead and lanthanum) containing 9% of lanthanum, measuring $5 \times 5 \times 5$ mm$^3$;

distance between the opposite surfaces of the elements 23 and 24: 2 cm;

distance between the exit surface of the element 24 and the lens 26: 10 cm;

lens 26: opening f/2, focal length 5 mm.

When, under these conditions, a voltage of 4 000 V is applied to the elements 23 and 24, the focussing point is displaced along the axis $X_1 X_2$ to the point $P_2$, thus travelling a distance $\Delta x$ of 90 μm.

In this way, it was possible to construct the experimental curve giving the distance $\Delta x$ expressed in microns in dependence upon the voltage applied expressed in volts. This curve is shown in FIG. 3. It can be seen that this curve has a quadratic appearance which is in fact due to the quadratic characteristic of the Kerr effect used. This shows in particular that the direction of the voltage applied is unimportant.

Two crossed cylindrical lenses are only comparable with a single spherical lens if the distance separating them is small by comparison with their focal length. In the present case, this focal length common to the two cylindrical lenses and to the equivalent spherical lens may be calculated as follows:

the point $P_1$ is the focal point of the lens 26 because it corresponds to the case where the voltage applied is zero;

the point $P_2$ is the image formed by the lens 26 of the focal point of the lens equivalent to the system composed of the elements 23 and 24;

the conventional formula $(1/p) + (1/p), = (1/f)$, i.e., $(1/p) + (1/4.91) = (1/5)$ gives a value of 245 mm for the distance $p$ from the centre of the lens 26 to this latter focal point;

taking as the centre of the equivalent lens the median point of the two elements 23 and 24 situated at a distance of 115 mm from the centre of the lens 26, the required focal length is thus 360 mm.

Accordingly, the relative value of the distance between the elements 23 and 24 to the equivalent focal length is approximately 6/100. This value is sufficiently low and it was possible to verify by experiment, i.e., by observing the Airy spot under a microscope, that it was not deformed to any significant extent.

If, however, it is desired to correct the residual aberrations arising out of this structure to the best possible extent, it is possible in a first stage to bring the elements 23 and 24 as close to one another as possible, the distance referred to above being in no way critical.

In a second stage, the characteristics of the elements 23 and 24 may be adjusted so that their effects are optimally combined, the closest to the lens 26 having a shorter equivalent focal length so that the defocussing in the two perpendicular planes is the same.

A first way of obtaining this result is to modify the dimensions of the elements 23 and 24 by cutting them differently, although it is necessary, for determining these dimensions, to proceed by successive approximations and no adjustment means are available for correcting the effects of production tolerances.

A second way is to apply different voltages to these elements, for example by using a different prepolarization for each of them. Although this prepolarization obviously reduces the deviation of the focussing point, it does enable variable control voltages to be used which are lower and hence more compatible with control devices using semiconductors. In addition, these two solutions may be combined with one another.

FIG. 4 illustrates in a diagrammatic manner limited to the characteristic elements of the invention an optical reader comprising a reading head for a videodisc 41 rotated about an axis $X_3 X_4$. This reading head comprises, aligned on an axis $X_1 X_2$ parallel to the axis $X_3 X_4$, the elements 21 to 26 similar to those bearing the same reference shown in FIG. 2 and, in addition, a semitransparent mirror 42, a lens 43, asn astigmatic lens 44, a detector 45 and a control box 46.

The elements 21 to 26 act in the same way as those of FIG. 2 to focus a light beam at a point $P_3$ which it is desired to keep on the surface of the videodisc 41 despite the translation movements of that surface along the axis $X_1 X_2$.

The reflecting surface of this videodisc reflects the light towards the lens 26 which thus retransmits a slightly divergent reading beam. This divergence corresponds to the convergence of the incident beam produced by the elements 23 and 24. It is also too slight to be visible in the Fig.

This reading beam again passes through the assembly composed of the elements 24, 25 and 23 which gives an image to infinity of the point $P_3$ in the direction $X_2 X_3$. The parallel reading beam emerging from the element 23 is reflected by the semitransparent mirror 42 towards the lens 43 which causes it to converge on the detector 45 after having passed through the astigmatic lens 44. This assembly functions in such a way that it delivers a focussing error signal to the connection 47 by a process which is described in French Patent Application No. 74.01 283. The error signal can be produced as described in this patent be detecting the shape of the light spot. The detector can comprise four photoelectric cells arranged in a square so that the light spot is formed substantially at the center of the square. The cells of one diagonal are connected to one adder and the cells of the other diagonal to a second adder. The adders are connected to a differential amplifier which produces an output indicating the error.

This error signal is used by the control box 46 which delivers to the connections 48 and 49 voltages for controlling the elements 23 and 24.

Thus, this system operates as a servosystem and tends to cancel the distance between the focussing point $P_3$ and the surface of the videodisc. All that remains is a residual error which is necessary for the operation of the servomechanism and which may be made as small as required by increasing the open loop gain.

The embodiment thus described is by no means a limitation of the invention and it is possible to use any other system for measuring defocussing placed in the optical return path of the reading beam in front of or behind the variable vergency elements.

FIG. 5 is a block diagram of one particular embodiment of the control box 46 comprising an amplifier 51, two biasing elements 52 and 53, two transistors 54 and 55 and four resistors $R_3$ to $R_6$.

The error signal arrives at the connection 47 which is connected to the input of the amplifier 51. The error signal thus amplified is applied to the biasing elements 52 and 53. These elements are circuits known in the art and enable the transistors to be biased in such a way that voltages substantially equal to half the feed voltage for a null input voltage are present at their collectors. The voltages thus delivered by the elements 52 and 53 thus enable these transistors to be controlled in such a way that variable voltages are obtained at their collectors which, when applied to the elements 23 and 24, displace the focussing point $P_3$ along the axis $X_1 X_2$ so as to keep this point $P_3$ on the surface of the disc 41 whilst tending to cancel the error voltage.

The output signals from these biasing elements are applied to the bases of the transistors 54 and 55 of which the emitters are connected to earth whilst their collectors are connected to a high voltage of approximately + 500 V by way of the resistors $R_3$ and $R_4$. Accordingly, the voltages obtained at these collectors are positive and variable in relation to earth and, in the case of the transistor 54, are applied to one electrode of the element 23 and, in the case of the transistor 55, to one electrode of the element 24.

The prebiasing voltage of these elements is obtained by applying to the other electrode of each of them voltages which are negative in relation to earth and very high, i.e., of the order of − 3,000 V. The voltage applied to the element 24 is directly obtained from the negative voltage source whilst the voltage applied to the element 23 is obtained from that source by means of a divider bridge consisting of the resistors $R_5$ and $R_6$, because it is necessary to apply a higher voltage to the element 24 which, being closer to the disc, has to produce greater defocussing so that the defocussings coincide in the two perpendicular planes.

It is pointed out that the transistors 54 and 55 are only subjected to a very much lower voltage than the total voltage applied to the elements 23 and 24 and that it is possible in this way to remain within present technological limits.

It is thus possible to construct simple, robust and inexpensive videodisc readers.

What we claim is:

1. A variable vergency apparatus for focussing an incoming light beam having a beam axis and being polarized along a first direction perpendicular to said beam axis, in a point moveable along said beam axis, said apparatus comprising:
   a first electro-optical astigmatic element for first focussing said incoming beam alike a first cylindrical lens delivering a first focussed beam; said first astigmatic element having a first astigmatism axis parallel to said first direction; a half-wavelength plate for rotating the polarization of said light beam to a second direction perpendicular to said beam axis and substantially perpendicular to said first direction;
   a second electro-optical astigmatic element for second focussing said focussed beam in said moveable point alike a second cylindrical lens; said second astigmatic element having a second astigmatism axis parallel to said second direction, whereby said first and second focussing combines themselves for focussing said incoming beam alike a single spherical lens; and control means for providing to said first and second electro-optical astigmatic elements control voltages for controlling said first and second focussing.

2. An apparatus as claimed in claim 1, wherein:
said first electro-optical astigmatic element comprises a first rectangular parallelepiped of electro-optical material having two faces perpendicular to said beam axis and two faces parallel to said first astigmatic axis, and two linear median electrodes parallel to said first astigmatic axis and deposited onto respectively said two faces parallel to said first astigmatic axis; and
said second electro-optical astigmatic element comprises a second rectangular parallelepiped of electro-optical material having two faces perpendicular to said beam axis and two faces parallel to said second astigmatic axis, and two linear median electrodes parallel to said second astigmatic axis and deposited onto respectively said two faces parallel to said second astigmatic axis.

3. An apparatus as claimed in claim 2, further comprising generator means for generating said incoming beam.

4. An apparatus as claimed in claim 2, wherein said electro-optical material is a titanate-zirconate of lead and lanthanum.

5. An apparatus as claimed in claim 4, wherein said material contains 9% of lanthanum.

6. An apparatus as claimed in claim 2, wherein control voltages applied to said first and second astigmatic elements are identical; said first and second astigmatic elements having different dimensions for making their focussing coincide.

7. An apparatus as claimed in claim 2 wherein said control means comprise means for providing different control voltages to said first and second astigmatic elements for making their focussing coincide.

8. An apparatus as claimed in claim 2, further comprising a fixed vergency spherical lens for increasing the whole vergency of said apparatus; said first and second astigmatic elements adjusting said whole vergency.

9. An apparatus for projecting onto a moving information support a reading spot, said apparatus comprising:
   means for generating a light beam having a beam axis and being polarized along a first direction perpendicular to said axis;
   a first rectangular parallelepiped of electro-optical material having two faces parallel to said beam axis and two faces perpendicular to said first direction, delivering a first focussed beam;
   two linear median electrodes perpendicular to said beam axis and to said first direction and deposited onto respectively said two faces perpendicular to said first direction;

means for rotating the polarization of said focussed beam by substantially 90°, defining a second direction;

a second rectangular parallelepiped of electro-optical material having two faces parallel to said beam axis and two faces perpendicular to said second direction, delivering a second focussed beam;

two other linear median electrodes perpendicular to said beam axis and to said second direction and deposited onto respectively said two faces perpendicular to said second direction;

a projection lens for focussing said second focussed beam onto said information support and collecting a return beam;

means for separating said return beam from said light beam;

means for analysing said return beam delivering an error signal measuring the defocussing distance between said reading spot and said information support; and control means for delivering to said two linear electrodes and to said two other linear electrodes, under the control of said error signal, control voltages for canceling said defocussing distance.

* * * * *